United States Patent
Ubben (10) Patent No.: US 11,777,316 B2
(45) Date of Patent: Oct. 3, 2023

(54) METHOD TO OPERATE A WINDFARM

(71) Applicant: General Electric Company, Schenectady, NY (US)

(72) Inventor: Enno Ubben, Salzbergen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/945,853

(22) Filed: Aug. 1, 2020

(65) Prior Publication Data
US 2021/0036519 A1 Feb. 4, 2021

(30) Foreign Application Priority Data
Aug. 2, 2019 (EP) .................................... 19189866

(51) Int. Cl.
*H02J 3/38* (2006.01)
*F03D 7/04* (2006.01)
*F03D 9/25* (2016.01)

(52) U.S. Cl.
CPC .............. *H02J 3/381* (2013.01); *F03D 7/048* (2013.01); *F03D 9/257* (2017.02); *F05B 2220/706* (2013.01); *F05B 2270/1071* (2013.01); *F05B 2270/337* (2013.01); *H02J 2300/28* (2020.01)

(58) Field of Classification Search
CPC ....... H02J 3/381; H02J 2300/28; F03D 9/257; F03D 7/048; F05B 2220/706; F05B 2270/337
See application file for complete search history.

(56) References Cited

U.S. PATENT DOCUMENTS

| | | | |
|---|---|---|---|
| 2006/0132994 A1* | 6/2006 | Delmerico | F03D 7/048 361/20 |
| 2009/0160187 A1* | 6/2009 | Scholte-Wassink | F03D 7/048 290/44 |
| 2015/0198145 A1 | 7/2015 | Diedrichs et al. | |
| (Continued) | | | |

FOREIGN PATENT DOCUMENTS

| | | |
|---|---|---|
| EP | 2072813 A2 | 6/2009 |
| EP | 2629386 A1 | 8/2013 |
| WO | WO2014/009223 A2 | 1/2014 |

OTHER PUBLICATIONS

European Search Report Corresponding to EP19189866 dated Jan. 29, 2020.

*Primary Examiner* — Joseph Ortega
(74) *Attorney, Agent, or Firm* — Dority & Manning, P.A.

(57) ABSTRACT

A method of operating a windfarm connected to an electric grid via a point of injection for injecting power from the windfarm to the electric grid, the windfarm including at least two generating units and a windfarm controller, the method comprising:

measuring 302 voltage and/or frequency characteristics of an electrical signal of the electric grid at the point of injection, communicating 304 to at least two generating units of the at least two generating units of the windfarm at least one control signal based at least in part on the measured voltage and/or frequency characteristics of the electrical signal of the electric grid at the point of injection, the at least one control signal being indicative of a grid situation at the point of injection;

controlling 306 the at least two generating units of the at least two generating units of the windfarm at least in part based on the communicated at least one control signal.

5 Claims, 7 Drawing Sheets

(56) References Cited

U.S. PATENT DOCUMENTS

2016/0010626 A1   1/2016  Gomis Bellmunt et al.
2017/0292498 A1* 10/2017  Garcia ................ H02J 13/0004
2019/0178229 A1   6/2019  Giertz

* cited by examiner

METHOD TO OPERATE A WINDFARM

FIELD

The subject matter described herein relates to methods of operating a windfarm, and more particularly to methods of operating a windfarm connected to an electric grid via a point of injection for injecting power from the windfarm to the electric grid. The subject matter described herein further relates to windfarms connected to an electric grid via a point of injection for injecting power from the windfarm to the electric grid.

BACKGROUND

A windfarm includes one or more wind turbines configured to generate electric energy from wind energy. Therefore, a windfarm includes one or more generators configured to deliver electric energy and power.

The generated electric power is delivered to an electric grid that transfers the electric power towards electric loads of one or more users.

Typically a windfarm includes a plurality of wind turbines and the electric grid transfers electric power to a plurality of loads of one or more users. The loads may include industrial loads and/or loads in households, loads related to transportation systems, etc.

The electric grid may be part of a more complex network, i.e. the electric grid may be connected to other electric grids and/or to a plurality of electric generators that simultaneously generate electric power that is transferred from the plurality of generators to one or more loads, typically a plurality of electric loads.

The system formed by the generators, e.g. the wind turbines in one or more windfarms connected to the electric grid or to interconnected electric grids, the one or more interconnected electric grids, and the one or more electric loads may be affected by imbalances and disturbances that may severely affect the quality of the delivered electric power.

For example, a sudden increase in the demand for electric power or a short circuit in a part of the system, or a sudden shortage of power delivered by some generators may cause a disturbance of the delivered electric power, e.g. characterized by a sudden voltage drop in one or more parts of the system, e.g. in one or more electric lines of one or more electric grids.

In order to prevent or to mitigate the effects of such disturbances or imbalances, it may be necessary or convenient to disconnect some electric connections in the system and/or to shut down some generators. For example, it may be convenient to disconnect some of the loads and/or some of the generators of e.g. one or more windfarms and/or to shut down e.g. at least some wind turbine generators.

The described disconnections and/or shutdowns may be necessary in order to restore a required quality of the electric power delivered to the loads, e.g. to restore a nominal voltage level and/or a nominal frequency in case of an AC power. It may be necessary to disconnect some of the loads and/or some of the generators in order to deliver power with a desired quality and stability to at least some of the loads in the system.

When the causes of the disturbances or the imbalances are mitigated or eliminated, e.g. when a short circuit is removed and/or an increased demand in electric power is not present anymore and/or when a delivery of power with required characteristics becomes possible again, the system may at least gradually return to a normal or nominal operation. Loads may be reconnected to the electric grids and/or disconnected grids may be interconnected again and/or disconnected generators may be reconnected to electric grids from which they were disconnected in order to cope with the disturbance and/or imbalance.

It may be beneficial to shut down and/or to disconnect generators, e.g. generators in a windfarm when an electric disturbance or imbalance affects an electric grid to which the generators, e.g. the generators in the windfarm, deliver generated electric power. The disconnection and/or the shutdown of the generators may also be beneficial in order to prevent damage to the generators and/or an unnecessary operation of the generators, e.g. of wind turbine generators in a windfarm, and/or e.g. power converters.

When disconnecting one or more generators from the electric grid, e.g. when disconnecting generators in a windfarm, it may be beneficial or necessary to shut down the generators. Generators may then be reactivated when the disturbance or the imbalance in the system ceases and when e.g. the signal in the at least one electric grid returns to normal or nominal levels in terms of e.g. voltage and frequency characteristics. However, restarting as known in the art causes problems and often does not support the grid as required.

SUMMARY

The present disclosure aims at overcoming or at least improving the problems in the art.

According to an aspect, a method of operating a windfarm connected to an electric grid via a point of injection for injecting power from the windfarm to the electric grid is described, the windfarm including at least two generating units and a windfarm controller, the method including: measuring a voltage and/or frequency characteristics of an electrical signal of the electric grid at the point of injection; communicating to at least two generating units of the at least two generating units of the windfarm, at least one control signal based at least in part on the measured voltage and/or frequency characteristics of the electrical signal of the electric grid at the point of injection, the at least one control signal being indicative of a grid situation at the point of injection; and, controlling the at least two generating units of the at least two generating units of the windfarm at least in part based on the communicated at least one control signal.

According to another aspect, a windfarm is provided, the windfarm including at least two generating units, a windfarm controller and at least one point of injection, the windfarm being connected to an electric grid via the at least one point of injection for injecting power from the windfarm to the electric grid, wherein the at least two generating units are capable of being controlled through a control signal by the windfarm controller, the windfarm controller being configured for being operated according to methods as described herein.

In particular, according to an aspect, a windfarm is provided, the windfarm including at least two generating units, a windfarm controller and at least one point of injection, the windfarm being connected to an electric grid via the at least one point of injection for injecting power from the windfarm to the electric grid, wherein the at least two generating units are capable of being controlled through a control signal by the windfarm controller, the windfarm controller being configured for being operated according to a method of operating a windfarm connected to an electric grid via a point of injection for injecting power from the windfarm to the electric grid, the windfarm including at least two generating units and a windfarm controller, the method including: measuring a voltage and/or frequency characteristics of an electrical signal of the electric grid at the point of injection; communicating to at least two generating units of the at least two generating units of the windfarm, at least one control signal based at least in part on the measured voltage and/or frequency characteristics of the electrical signal of the electric grid at the point of injection, the at least one control signal being indicative of a grid situation at the point of injection; and, controlling the at least two generating units of the at least two generating units of the windfarm at least in part based on the communicated at least one control signal Further aspects, details and advantages are evident from the accompanying drawings, the detailed description and the dependent claims.

DETAILED DESCRIPTION OF EMBODIMENTS

If a generating unit, such as a wind turbine, is reconnected to an electric grid too early, i.e. when the disturbance or the imbalance is still affecting the system, and/or if the generating unit in a shutdown state starts to deliver power while the disturbance or the imbalance is still affecting the system, the disturbance or imbalance may be worsened or at least it may become more difficult to deliver a stable power and/or voltage. The whole system may become unstable or chaotic or an unstable condition of the system may be worsened, if e.g. the generating units in a shutdown state start to deliver power too early to one or more electric grids in a system that is or was affected by a disturbance or imbalance.

It is therefore beneficial to prevent an undesirable restart of the generating units in a windfarm in the presence of an electric grid affected by a disturbance or imbalance.

Methods of the present disclosure monitor a voltage, e.g. a three-phase AC voltage and/or a frequency at a point of injection where electric power is injected into an electric grid, the electric power being delivered by one or more generators, e.g. by wind turbine generators in a windfarm. If the monitored voltage or frequency is outside a predefined range, e.g. when a disturbance affects the electric grid, an indication is sent to all generators to prevent a restart or reconnection of the generators to the grid. For example, a windfarm controller may send an indication to all wind turbine generators of a windfarm to prevent a restart or reconnection of the wind turbine generators to the electric grid.

The indication signal may be designed in a fail-safe manner. If a communication from e.g. the windfarm controller to one or more wind turbine generators of the windfarm is lost, the wind turbine generators are typically still prevented from reconnecting to the grid and/or from restarting.

At the windfarm level, e.g. at a point of injection of electrical power generated by generators of the windfarm into an electric grid that transfers power towards one or more loads, voltage and frequency is monitored. For example, a three phase voltage is monitored, e.g. measuring phase-to-phase voltages. A frequency for each phase may be measured. If some monitored/measured values are outside a predefined range, the windfarm controller sends an indication to all generating units, e.g. wind turbines, photovoltaic converters, battery energy storage system converters, to prevent a restart and a reconnection of the units to the grid.

The indication signal between the windfarm controller and the unit is designed in a fail-safe manner. In the case of a loss of communication, the units per default would not reconnect to the grid or restart.

In some embodiments, the functionality may be enhanced by further grid protection devices or substation systems interfacing via a digital failsafe signal to the windfarm controller of a windfarm. In some embodiments, the windfarm controller of the windfarm may receive signals from an external device, e.g. from grid protection devices or other stations monitoring an electric grid or line to which power is further delivered under normal or nominal circumstances. In some embodiments, both the windfarm controller voltage and frequency readings must be back inside an allowed range and the external device must release a failure condition to allow a restart of generating units.

The functionality can also be configured to only consider the external device. In this case, monitoring of voltages and frequency directly at the point of injection of electrical power generated by generators of the windfarm into the at least one electric grid is disabled. In some embodiments, the disabling can be done based for example on a change in the contingency case, e.g. during normal operation a windfarm injects the power to one point of injection, which is monitored by the local windfarm controller of the windfarm, whereas in a contingency case, i.e. during a disturbance or imbalance, the windfarm controller is operating as a slave controller, and a monitoring takes place by a master controller. In this case, the master controller takes over the monitoring of voltages and frequencies, and the slave controller only communicates to units controlled by the slave controller transmitting the information received from the master controller; i.e. the master controller takes over the responsibility of the voltage and frequency monitoring, and the slave windfarm controller only passes the information to the units controlled by the slave controller.

The functionality supports a configurable pick-up delay to ensure that voltage and frequency readings are stabilized in the defined ranges.

Methods of the present disclosure are beneficial for windfarm operation, and in particular a restart of units during a disturbance/contingency may not, or may not only be handled at unit level, e.g. at the level of the single wind turbine generators, but may be handled with respect to a measured voltage or frequency characteristics at the point of injection and/or with respect to a signal received from an external device. The communicated control signal is typically communicated to all generating units of the windfarm. The communicated control signal may allow a handling of the disturbance/contingency e.g. at the windfarm level, e.g. by a windfarm controller that may be more reliable than a handling at unit level. Also, it becomes possible to better coordinate a disturbance handling affecting a plurality of windfarms e.g. windfarms interconnected to form e.g. a configurable distributed windfarm, when e.g. a master controller of the plurality of windfarms transmits a control signal to wind turbine generators of the plurality of windfarms operated e.g. as slaves controlled by the master controller and/or through slave controllers.

When individual wind turbine generators, i.e. individual units, operate separately, e.g. separately and/or independently measuring voltages and frequencies at the unit level, an unstable or chaotic restart or reconnection may occur that may, at least temporarily, affect the quality of the restart/reconnection process e.g. due to delays and/or feedbacks.

Operating a windfarm according to the methods of the present disclosure may therefore prevent instabilities and chaotic dynamics during a reconnection and/or a restart of wind turbine generators of a windfarm after a disturbance/contingency occurred e.g. in an electric grid to which the windfarm delivers power during nominal operation.

Nevertheless, in some embodiments, single wind turbine generators in the windfarm may still be operated individually, e.g. a restart of single wind turbines may be controlled individually and/or may be controlled with the use of a controller of the wind turbine, that may e.g. be a controller located in the wind turbine, based on e.g. a voltage and/or a frequency measured at the wind turbine location. It is intended therefore that present embodiments do not conflict with the possibility of an individual and/or local operation and/or control of single wind turbines in a windfarm and e.g. it may be possible to switch from a local control to a control by a windfarm controller according to embodiments of the present disclosure.

Figure 1:
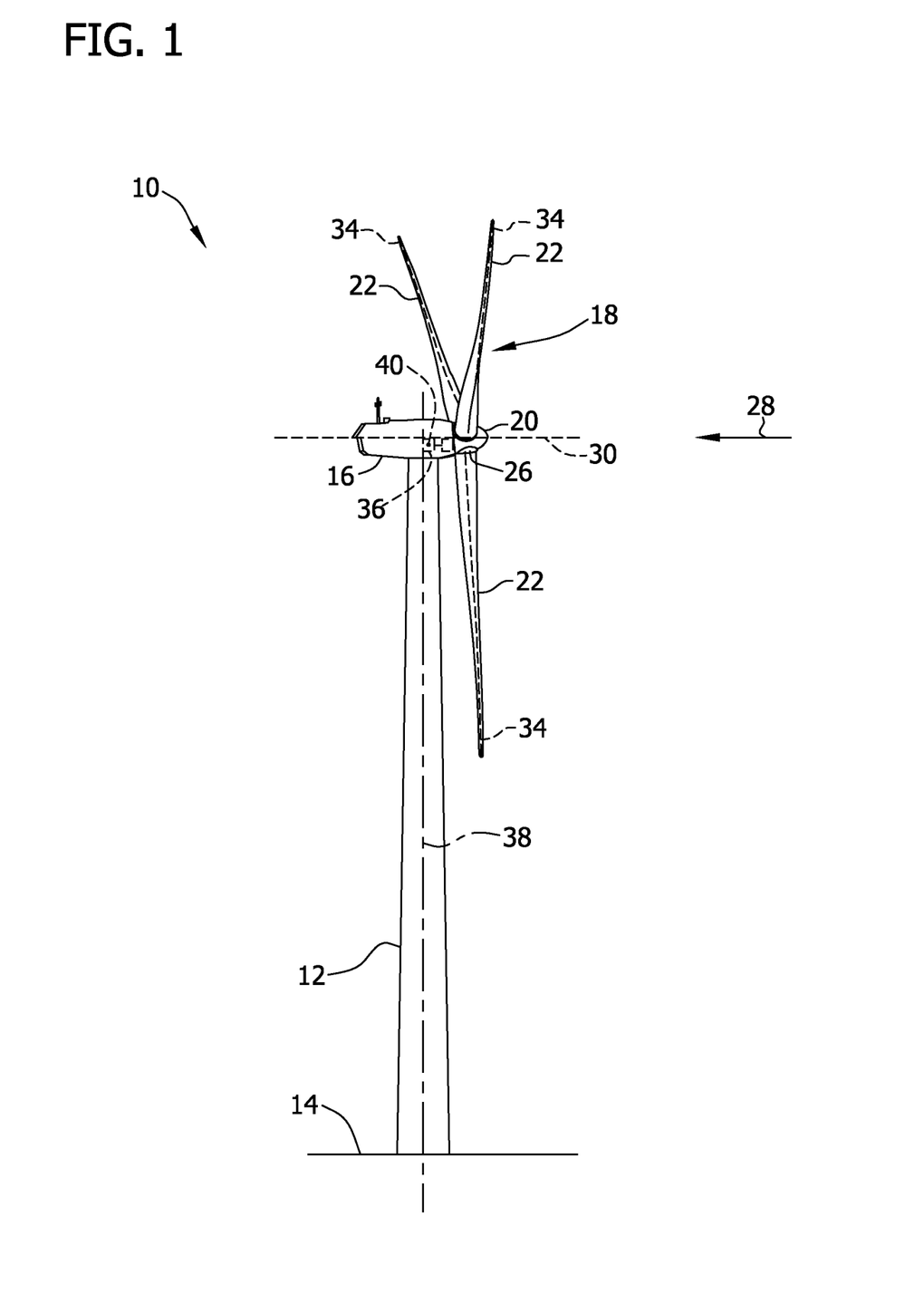
FIG. 1 schematically shows a wind turbine according to embodiments of the present disclosure.

FIG. 1 shows a wind turbine 10. The wind turbine may include a support system 14, a tower 12, a nacelle 16, and a rotor 18. A rotor 18 of a wind turbine 100 may include one or more rotor blades 22, with pitch axes 34. In a load transfer region 26, a load or torque may be transferred from the rotor 18 to a rotatable hub 20 configured to rotate around an axis of rotation 30. Wind flowing in a direction 28 may transfer kinetic energy to the rotor blades 22, in dependency of an adjustable pitch angle of the rotor blades. A wind turbine 10 may include a control system 36 with a processor 40. A wind turbine may be configured to be rotatable around an axis 38 in order to orient a rotor 18 with respect to a wind direction 28.

A wind turbine 10 may be configured to convert kinetic energy of the wind flowing in a direction 28 or of wind having a component flowing in the direction 28 to rotational kinetic energy of the rotor 18 of the wind turbine. The rotational kinetic energy of the wind turbine may be further converted to electric energy by a wind turbine generator forming a generating unit.

A control system 36 may operate the wind turbine in order to e.g. control a pitch angle of the rotor blades such that a speed and/or a torque of the rotor may remain in a convenient range for the generation of electric energy. The control system may also shut down or switch off the wind turbine e.g. when a disturbance is detected and/or e.g. when the wind speed exceeds a limit for a safe operation of the wind turbine in order to e.g. avoid damage to the wind turbine and/or an unnecessary operation of the wind turbine in the presence of e.g. a disturbed grid.

Figure 2:
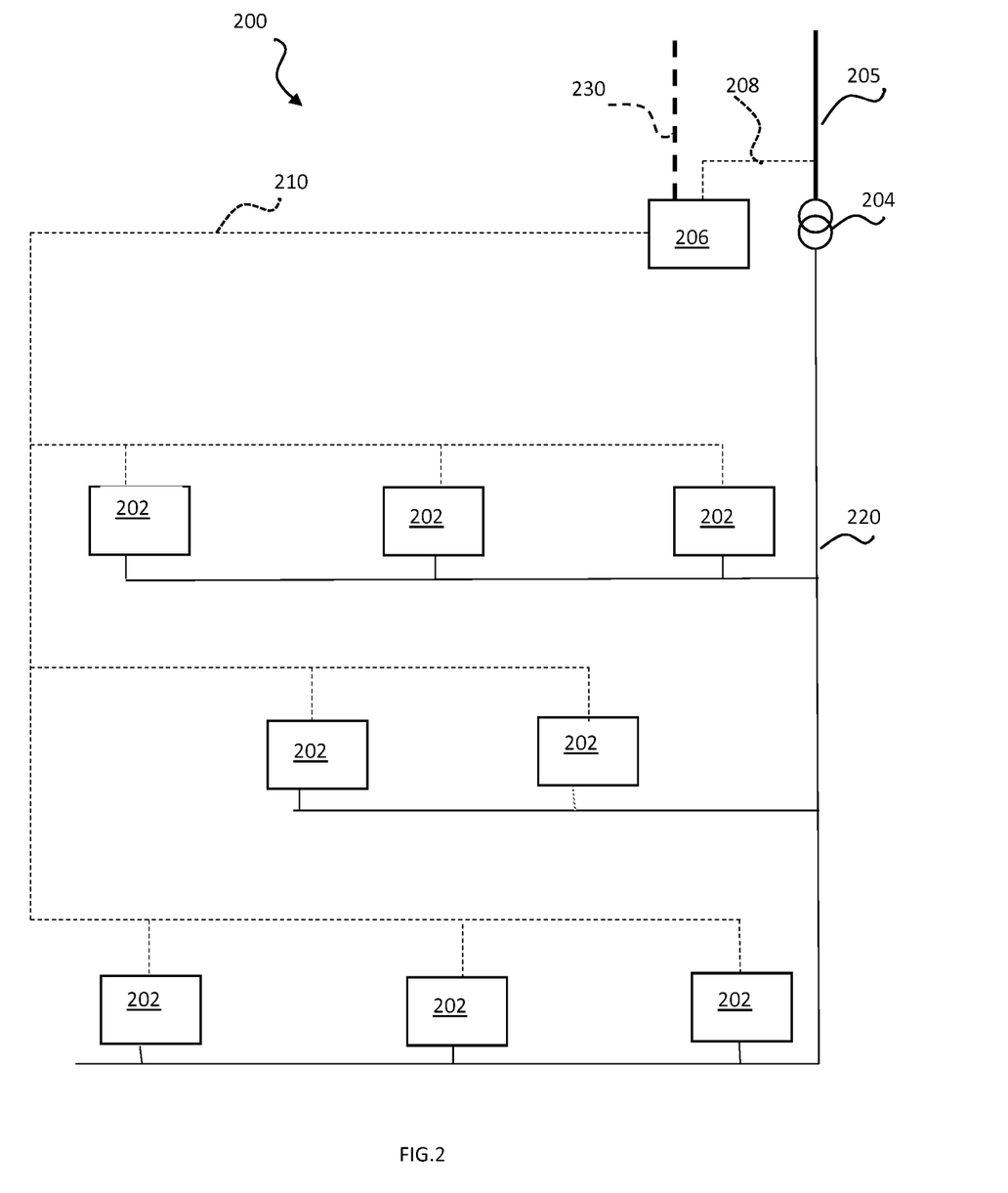
FIG. 2 schematically shows a windfarm with wind turbines and a point of injection for the delivery of electric power to an electric grid according to embodiments of the present disclosure.

FIG. 2 shows a windfarm 200 including at least two wind turbines 202. The wind turbines in the windfarm may e.g. be wind turbines according to FIG. 1. It is intended that a plurality of wind turbines may be present that may be of different types, e.g. with a variable number of blades. Wind turbines 202 may receive one or more control signals 210, e.g. a control signal for each wind turbine and/or a collective control signal for a plurality of wind turbines in the windfarm, from a windfarm controller 206. Wind turbines 202 are further configured to deliver generated electric power, e.g. the power generated from kinetic wind power, to a point of injection 204 through e.g. one or more electric lines 220. During operation of the wind turbines, the electric power is transferred from wind turbines 202 to the one or more lines 220 to the point of injection 204 where the power is further transferred to an electric grid 205. FIG. 2 may show only a terminal of the electric grid 205 that further transfers the generated electric power towards one or more loads.

The windfarm controller 206 may monitor the electric grid 205, receiving measures of voltages and/or frequencies of the electric grid 205 through a measurement input 208 to the windfarm controller 206.

The windfarm controller 206 may operate as a master controller, sending at least one control signal 210 to wind turbines 202 of the windfarm 200 based on e.g. a voltage and/or a frequency of the electric grid 205 at the point of injection 204, measured through the measurement input 208. The electric grid 205 at the point of injection 204 may be formed by e.g. a plurality of lines and/or transformers and/or converters and/or inverters. The voltage and/or frequency of the electric grid 205 at the point of injection 204, measured through the measurement input 208, may not necessarily be a voltage and/or a frequency that is physically measured at a close distance from the point of injection 204. In some embodiments for example, the voltage and/or the frequency may be measured at any point of the electric grid 205 connected to the point of injection 204, e.g. also at a significant physical distance from the point of injection 204 and/or measured e.g. at the output of further transformers and/or converters and/or inverters that may be part of the electric grid 205. Therefore, a voltage and/or a frequency of the electric grid 205 at the point of injection 204, measured through the measurement input 208, may be any voltage and/or frequency of the electric grid that is connected to the point of injection 204 rather than a voltage and/or frequency physically measured close to the point of injection 204. In yet other embodiments, the measurement of the voltage and/or the frequency of the electric grid at the point of injection may be configurable, such that measurements at different locations of the electric grid may be alternatively possible, e.g. a measurement very close to the point of injection and/or one or more measurements at a greater distance and/or at the output of e.g. transformers, inverters or converters forming the electric grid 205. Also the windfarm controller 206 may be located anywhere, e.g. physically close to the point of injection 204 or at a significant distance from the point of injection 204. The measurement received by the windfarm controller 206 through the measurement input 208 may also be based on an average of a plurality of measurements, e.g. at different locations of the electric grid and/or based on characteristics of a plurality of measurements. For example, based on one or more measurements at one or more locations of the electric grid 205, the windfarm controller 206 may operate according to a worst case characteristics of measured values obtained with the one or more measurements. For example if some measurements are within nominal intervals, and others not, the windfarm controller 206 may operate considering one or more measurements outside the nominal intervals.

In some embodiments, a windfarm controller may be any device capable of measuring any voltage, e.g. a RMS voltage, and/or a frequency of the electric grid, e.g. a spatial and/or a temporal average voltage and/or average frequency, or a voltage and/or frequency that may depend on voltages and/or frequencies at different points of the grid. A windfarm controller may e.g. be any device capable of monitoring any distributed voltage and/or frequency characteristic of the grid, wherein the windfarm controller is further capable of sending a control command to generating units of the windfarm, e.g. to wind turbine generators, converters, etc. A windfarm controller may receive a control command from another controller passing it through towards generating units and/or further controllers. In some embodiments, the measured voltage and/or frequency may be configured such that e.g. different types of measurements are possible, e.g. at different locations of the grid. In particular, the windfarm controller may e.g. be operated by a grid utility operator, being used for monitoring the condition of the grid and controlling e.g. generating units of a windfarm based on the monitored condition of the grid.

Alternatively, the windfarm controller 206 may operate as a slave controller receiving and passing through a control signal 230. It is intended that the control signal 230 may originate from e.g. an additional controller in e.g. a hierarchical control structure and/or from any external device or substation system and that the control signal 230 may be passed through towards wind turbines 202, i.e. the control signal 210 may be based at least in part on the control signal 230 when the windfarm controller 206 operates as a slave controller. In some embodiments, the control signal 230 may be any control signal dependent on a grid condition and/or on decisions of e.g. a grid utility operator.

The point of injection 204 and the electric grid 205 may be configured/selected, e.g. through one or more switches and/or circuit breakers; i.e. electric power generated by the wind turbines 202 may be selectively delivered to an electric grid 205 through a point of injection 204 that may be selected from a set of possible electric grids together with related points of injection.

A wind turbine 202 may include a generating unit, e.g. a wind turbine generator configured to generate electrical power from kinetic power of the wind.

Figure 3:
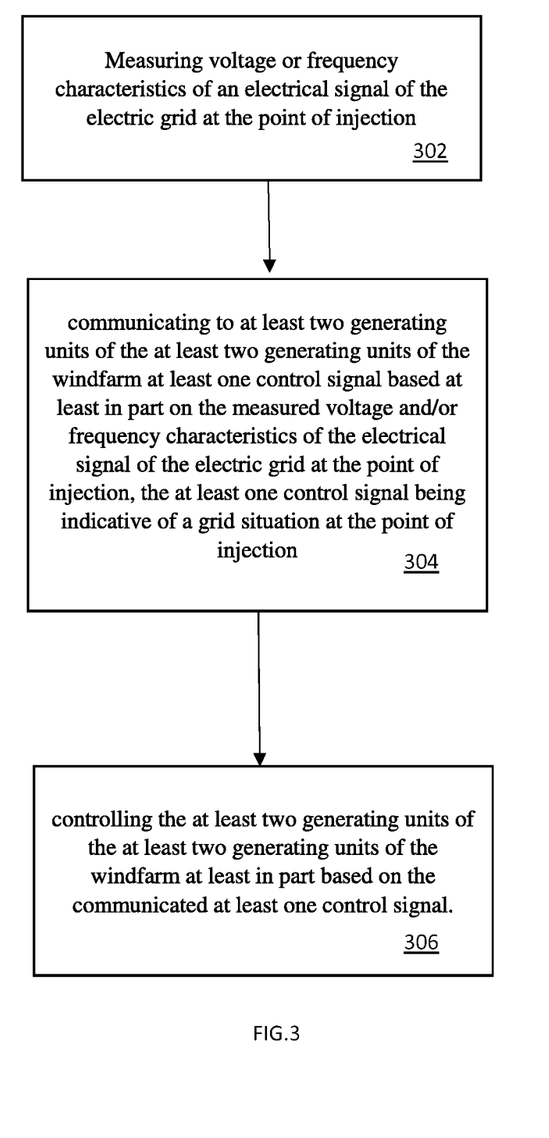
FIG. 3 illustrates a method of operating a windfarm according to embodiments of the present disclosure.

FIG. 3 illustrates a method of operating a windfarm 200 connected to an electric grid 205 via a point of injection 204 for injecting power from the windfarm 200 to the electric grid 205, the windfarm 200 including at least two generating units e.g. generating units of the wind turbines 202, according to embodiments of the present disclosure. The method includes: measuring 302 voltage and/or frequency characteristics of an electrical signal of the electric grid 205 at the point of injection 204, communicating 304 to at least two generating units of the at least two generating units of the windfarm 200, at least one control signal 210 based at least in part on the measured voltage and/or frequency characteristics of the electrical signal of the electric grid 205 at the point of injection 204, the at least one control signal being indicative of a grid situation at the point of injection, controlling 306 the at least two generating units of the at least two generating units of the windfarm at least in part based on the communicated at least one control signal 210.

In some embodiments, the voltage or frequency characteristics of an electrical signal of the electric grid 205 at the point of injection 204 are e.g. a three-phase AC voltage and frequency measured e.g. at the electric grid to which power nominally generated by the wind turbine generators of the windfarm is nominally injected/transferred through the point of injection 204. Therefore, in some embodiments, the measuring 302 includes measuring three voltages and three frequencies, one for each phase or pair or combination of different phases. The measured voltages may e.g. be RMS voltages. In other embodiments, a different number of phases may be considered.

In some embodiments, the voltage of a three-phase AC voltage may be described by an ordered triple where each component of the triple indicates for example an RMS value of a voltage related to each phase or to each pair or combination of different phases. In other embodiments, the component may indicate a maximum value of a voltage related to each phase during one or more periods of the AC voltage related to each phase or to each pair or combination of different phases. In other embodiments, the voltage of a three-phase AC voltage may be described by an ordered triple where each component of the triple indicates other characteristics of a voltage related to each phase or to each pair or combination of different phases, like e.g. an average voltage, a maximum voltage over a time interval, a minimum over a time interval of local maxima of voltages for each period of e.g. a 50 Hz or 60 Hz signal, a transformed or filtered value of the voltage, etc. In some embodiments, alternatively a power related to the voltage may be considered, like e.g. an active or a reactive power.

It is intended that in some embodiments a three-phase AC voltage may be characterized by an ordered triple of values that may indicate e.g. phase-to-phase voltages of the three-phase AC voltage. In some other embodiments, the three-phase AC voltage may be characterized by an ordered triple of values indicating e.g. phase-to-neutral voltages.

In some other embodiments, the voltage may be a DC voltage and the frequency measurement may not be carried out or may be related to a noise signal affecting the DC voltage or may be related to a derivative of the DC voltage indicating a change over time of the DC voltage.

When communicating 304 at least one control signal 210 to at least two generating units of the at least two generating units of the windfarm 200, the at least one control signal 210 is indicative of a grid situation at the point of injection 204, e.g. of a grid disturbance. The control signal indicates e.g. if a grid disturbance is detected based on the measured voltage and/or frequency characteristics of the electrical signal of the electric grid at the point of injection.

For example, if in the ordered triple measuring a three-phase AC voltage at least one component is outside a predefined voltage range, e.g. outside a predefined voltage range related to RMS voltages, a grid disturbance may be detected therefrom. For example, the voltage range may be specified by the interval [0.95 $U_{nominal}$, 1.05 $U_{nominal}$] wherein $U_{nominal}$ is a nominal voltage of the grid, for example in some embodiments a nominal RMS voltage between different phases or, in some embodiments, a RMS voltage between phase and neutral. In some embodiments, the interval specifying the voltage range may be the interval [0.95 $U_{nominal}$, ∞[. In some embodiments, if in an ordered triple measuring frequencies related to each phase or to each pair or combination of different phases a component of the triple is outside a predefined frequency range, a grid disturbance may be detected therefrom. For example, the frequency range may be specified by the interval [49.9 Hz, 50.1 Hz]. The at least one control signal 210 may therefore be indicative of a grid situation, e.g. a grid disturbance related to a voltage outside the predefined voltage range or to a frequency outside the predefined frequency range.

In some embodiments, both an ordered triple of voltages and an ordered triple of frequencies may be measured, e.g. as described previously, and a grid disturbance may be detected based on any component of the triples that is outside a predefined range, e.g. a voltage range for components relating to voltages and/or a frequency range for components relating to frequencies. The voltage components may relate to RMS voltages of a three-phase voltage. It is intended that if only e.g. one component of e.g. a triple or a sextuple or if e.g. one component of two triples is outside the corresponding predetermined range, e.g. a voltage range or a frequency range, a grid disturbance may be detected.

In some embodiments, the grid disturbance may be detected based on e.g. instantaneous values of a three-phase voltage, e.g. based on instantaneous phase-to-phase voltages of an AC three-phase voltage, e.g. on a voltage triple related to instantaneous phase-to-phase voltages, and in particular on an asymmetric condition of said AC three-phase voltage. In some embodiments, the AC three-phase voltage may be described by e.g. a voltage triple related to instantaneous phase-to-neutral voltages.

In some other embodiments, the grid disturbance may be detected based on any suitable characteristics of e.g. a three-phase AC voltage in order to differentiate an actual measured three-phase AC voltage of the electrical signal of the electric grid at the point of injection from a nominal three-phase voltage in order to detect a disturbance or a probable disturbance. For example, the detection of the disturbance may be based on an asymmetry of the three-phase AC signal. The at least one control signal 210 may therefore be indicative of a grid situation, e.g. a grid disturbance, based at least in part on the measured voltages and/or frequencies. For example, a grid situation characterized by a grid disturbance detected in embodiments of the present disclosure may be indicated by the at least one control signal 210.

In yet other embodiments, the grid disturbance may be detected based on any suitable characteristics of e.g. a DC voltage of the electric grid at the point of injection, and at least one control signal indicative of the corresponding grid situation is communicated accordingly.

The signal communicated in box 304 may be communicated by the control signal 210 to generating units of wind turbines 202 in the windfarm 200. The signal communicated in box 304 may be indicative of a grid disturbance, the grid disturbance being detected in embodiments of the present disclosure e.g. according to any of the described alternatives. The communicated control signal 210 typically indicates if a disturbance at the point of injection 204 is being detected according to one of the described alternatives, e.g. if some components of an ordered triple describing a three-phase AC voltage or frequency of the electric grid 205 is outside a predetermined voltage or frequency range. The communicated control signal 210 may also indicate the absence of a disturbance, i.e. the communicated control signal may be capable of communicating that a disturbance is not present or not present anymore, i.e. that a disturbance is not detected or not detected anymore, e.g. when voltages and frequency of the electric grid 205 at the point of injection 204 are within a range indicative of a regular or nominal condition of the electric grid.

The at least two generating units of the windfarm, for example generating units of wind turbines 202, are controlled according to box 306 and the controlling is at least in part based on the communicated at least one control signal 210.

When the control signal 210 indicates a detected grid disturbance, the generating units may be halted or switched off or a shutdown of the generating units may occur. Already switched off or disconnected units may be prevented from restarting and/or reconnecting.

When the at least one control signal 210 communicated in box 304 indicates the absence of a grid disturbance, i.e. when a grid disturbance is not detected, the generating units may restart and/or may be reconnected to the electric grid 205 or, if the units were already delivering power to the electric grid 205, they are allowed to further continue the delivery of power to the electric grid 205.

In some embodiments, when an absence of a grid disturbance is detected for the first time after the detection of the presence of a grid disturbance, i.e. when a return to normality is first detected after the occurrence of a disturbance, the control signal 210 may not immediately indicate the absence of grid disturbance and the absence of grid disturbance may be communicated only after a predetermined time delay, e.g. after a time delay corresponding to the length of a predetermined time interval, in order to further improve an ordered restart and/or reconnection of generating units.

Figure 4:
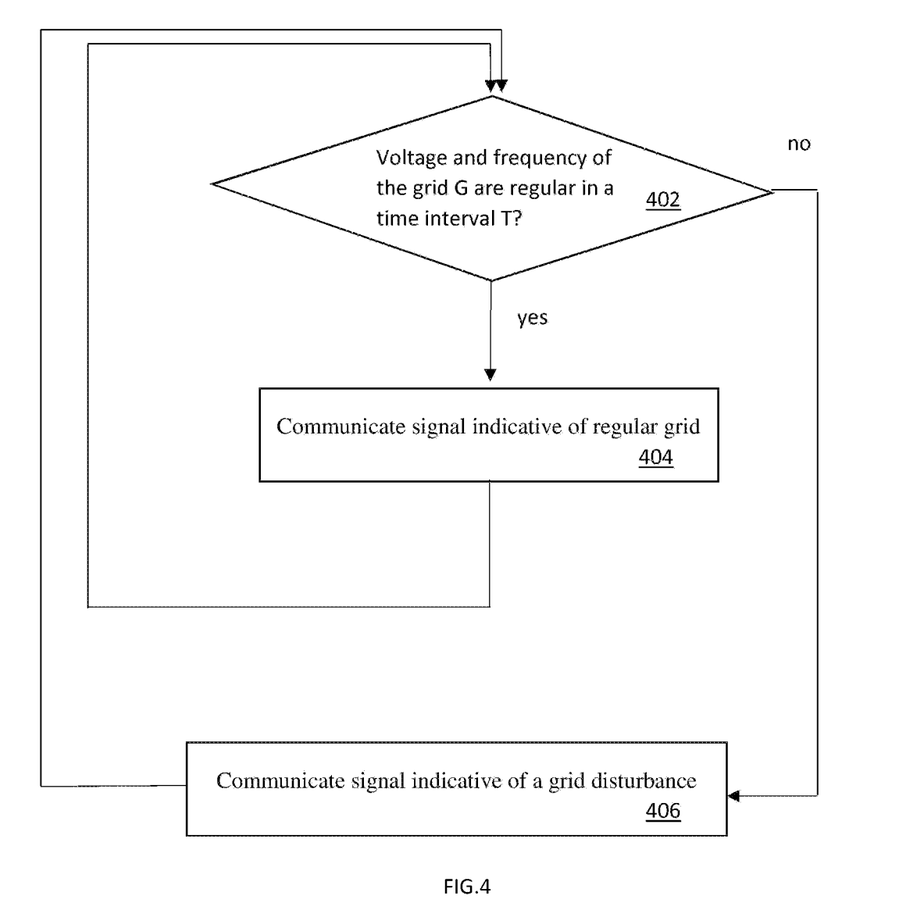
FIG. 4 illustrates a flowchart related to a method of operating a windfarm according to embodiments of the present disclosure describing in particular a communication of a control signal indicative of a grid condition/situation.

FIG. 4 illustrates a flowchart related to a method of operating a windfarm according to embodiments of the present disclosure describing a communication of a control signal indicative of a grid situation/condition.

The symbol G indicates an electric grid, e.g. the electric grid 205, to which a windfarm is connected via a point of injection for injecting power from the windfarm to the electric grid G, e.g. the point of injection 204.

The symbol T indicates a time interval during which a voltage and frequency of the grid G is measured, e.g. a time interval including a current time instant, or e.g. a time interval that includes a current time instant and one or more past time instants, e.g. including all past time instants between a current time instant and some time instant in the past. In some embodiments, the time interval T may be of fixed length, in other embodiments the time interval T may be of variable length. In some embodiments, the time interval T may include only a time instant, e.g. a present time instant. In some embodiments, T may be a time interval $T=T(t_0)=\{t|t_0-\Delta \leq t \leq t_0\}$ dependent on a current time instant $t_0$ and including all instants between a time instant $t_0-\Delta$ and $t_0$ and further including $t_0$ where $\Delta$ is a fixed delay or time length, i.e. $T(t_0)$ includes the last time instants up to a delay or time length $\Delta$. In some embodiments, T may include only a present time instant $T=T(t_0)=\{t|t=t_0\}$. It is intended that T is not empty.

During one or more time instants in T, voltage and frequency of an electric signal of the electric grid G are measured, e.g. are sampled and/or measured repeatedly or at regular intervals and a sequence of measured values may be obtained. The measured values may relate to instantaneous values and/or to an average and/or to e.g. RMS values of voltages and/or frequencies. Measured values may further be based on an interpolation of values related to one or more time instants in T.

In some embodiments, the sequence of measured values may be formed by a finite number of values that may be scalars or tuples, e.g. triples or sextuples. In some embodiments, the sequence may be formed by one value that may be a scalar or a tuple, e.g. an ordered triple or an ordered sextuple. In some embodiments, the triples may include information on a three-phase voltage of an electric signal of the electric grid G at the point of injection. In some embodiments, sextuples may include information on a three-phase voltage of an electric signal of the electric grid G at the point of injection together with information on frequencies of a three-phase electric signal, e.g. frequencies related to each possible phase-to-phase combination or phase-to-neutral combination.

According to block 402 in FIG. 4, it is checked if the measured voltages and/or frequencies are regular, i.e. if they are within allowable bounds. In some embodiments, if one measured voltage or one measured frequency of the grid G, e.g. of the electric grid 205, in a sequence of measured voltages and/or frequencies of the grid G during the interval T is not regular, i.e. is not within predetermined allowable bounds, e.g. upper and/or lower bounds, then a grid disturbance is flagged and/or communicated. In some embodiments, if all measured voltages and frequencies of the grid G, e.g. the electric grid 205, in a sequence of measured voltages and/or frequencies of the grid G during the interval T are regular, i.e. are within allowable bounds, e.g. upper and/or lower bounds, then a grid disturbance is not flagged and/or not communicated and a signal indicative of a regular gird may be communicated.

In some embodiments, said sequence may be formed by only one measured value corresponding to a measurement at a present time instant $t_0 \in T$, that may be related to e.g. one period of an AC signal, e.g. a three-phase AC signal. In other embodiments, said sequence may be formed by one or more measured values corresponding to one or more measurements during the interval T. The measurements may relate to RMS voltages and to frequencies of a three-phase AC voltage.

In some embodiments of the present disclosure, if all voltages and frequencies in a sequence of measured voltages and measured frequencies in block 402 are found to be regular, i.e. within e.g. upper and/or lower bounds indicative of a regular grid condition, then a signal indicative of a regular grid is communicated in block 404. The signal indicative of a regular grid communicated in block 404 may form a control signal 210 communicated to generating units of e.g. the wind turbines 202 of the windfarm 200.

In some embodiments, if at least one voltage or frequency in a sequence of measured voltages and measured frequencies related to the time interval T in block 402 is found to be not regular, e.g. above upper or below lower bounds indicative of a regular grid condition, then a signal indicative of a grid disturbance is communicated in block 406. The signal indicative of a grid disturbance communicated in block 406 may form a control signal 210 communicated to generating units of e.g. the wind turbines 202 of the windfarm 200.

After the communication in block 404 and after the communication in block 406, a further check is performed in block 402 for an updated present time instant $t_0$, with the consideration of a new or updated interval $T=T(t_0)$ related to the updated present time instant.

The execution illustrated in FIG. 4 may be implemented on a controller, e.g. a windfarm controller that may be a local windfarm controller or a remote windfarm controller, e.g. a master controller. The windfarm controller may e.g. be the windfarm controller 206.

The signal communicated in block 402 and the signal communicated in block 406 are transmitted to at least two generating units of the at least two generating units of the windfarm. The generating units may e.g. be generating units of the wind turbines 202 of the windfarm 200. The communication of the signal of block 404 and the communication of the signal of block 406 may be a communication between the controller that implements the execution of the flowchart shown in FIG. 4 and at least two generating units of the windfarm, e.g. two wind turbine generators, and said communication may be implemented e.g. on a transmission line and/or through waveguides and/or through a wireless communication channel and/or a radio broadcast and/or through packets on a digital communication network and/or through analog signals on a wire or on a coaxial cable and by any other implementation configured to transmit information like e.g. digitally encoded information or analog information like e.g. information carried by a modulated carrier or encoded by an electric signal with time varying characteristics.

Figure 5:
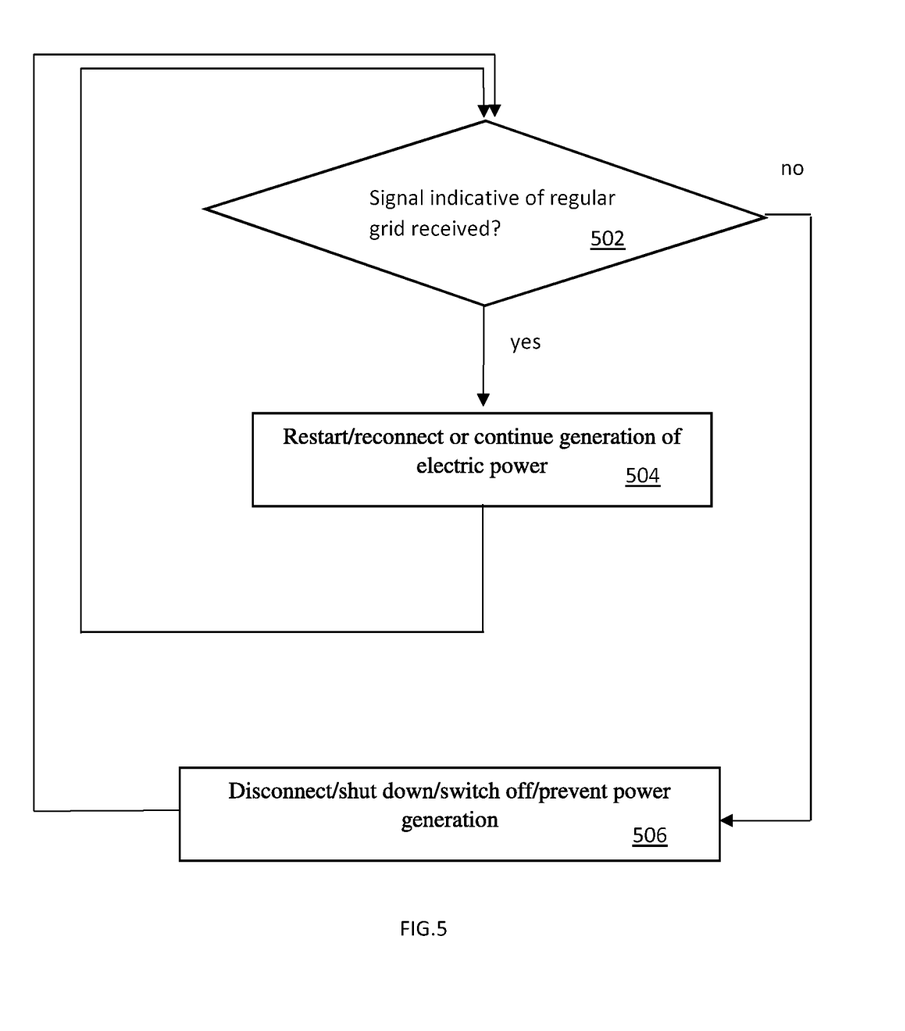
FIG. 5 illustrates a flowchart related to a method of operating a windfarm according to embodiments of the present disclosure describing a control of generating units of the windfarm.

FIG. 5 illustrates a flowchart related to a method of operating a windfarm according to embodiments of the present disclosure, describing a control of generating units, e.g. wind turbine generators, of the windfarm, e.g. the windfarm 200.

According to embodiments of the present disclosure, at least two generating units of the windfarm are configured to operate according to the flowchart illustrated in FIG. 5.

Each generating unit may check according to block 502 if a signal indicative of a regular grid is received. The signal in block 502 may e.g. be the control signal 210 received by e.g. generating units of the wind turbines 202 such as e.g. wind turbine generators of the wind turbines 202. In some embodiments, the signal indicative of a regular grid received in block 502 by each generating unit is the signal communicated from block 404 or from block 406, e.g. communicated by a windfarm controller according to FIG. 4 over e.g. a communication channel between the windfarm controller and the generating unit. The signal received in block 502 may be communicated by the one or more control signals 210. For example, if a signal indicative of a regular grid is communicated in block 404, then the condition in block 502 evaluates to true, and otherwise to false. In particular, if a signal indicative of a grid disturbance is communicated, the condition in block 502 evaluates to false. In some embodiments, also an absence of signal, e.g. due to communication problems, may result in the condition in block 502 evaluating to false. If the condition in block 502 evaluates to true, the execution of the flowchart of FIG. 5 proceeds with block 504, otherwise the execution proceeds with block 506.

For each current time instant $t_0$ and/or time interval $T(t_0)$, either a signal indicative of a regular grid is transmitted in block 404 or a signal indicative of a grid disturbance is transmitted in block 406, therefore a transmission at the same time and/or for the same time interval T of a signal indicative of a regular grid and a signal indicative of a grid disturbance is excluded. A signal may be transmitted, but it may be not received by e.g. a generating unit e.g. due to communication problems over a communication channel. If in block 502 a signal indicative of a regular grid transmitted e.g. from block 404 is not received, then in block 502 a signal indicative of a grid disturbance may be received from block 406 or an invalid signal or the absence of signal may be received/detected in block 502. An invalid or absent signal in block 502 may correspond to a signal indicative of a grid disturbance according to block 406.

If in block 502 a signal indicative of a regular grid is received by the generating unit, then, according to block 504, the generating unit may continue the generation of electric power in the case that the generating unit was actually generating power, or the generating unit may restart and/or reconnect in order to restart a delivery of electric power towards the grid G of block 402, for example the electric grid 205. The generating unit may be a generating unit of a wind turbine 202 of the windfarm 200 and the flowchart of FIG. 5 may be implemented on e.g. a local controller of the wind turbine.

If in block 502 a signal indicative of a regular grid is not received, e.g. if a signal indicative of a grid disturbance is received and/or if an invalid signal is received or an absence of signal is detected, then, according to block 506, the generating unit may be disconnected, or switched off, or a shutdown may take place or the generating unit may be kept in a disconnected or switched off state or a shutdown may be further prolonged. In block 506, the generating unit is prevented from generating power and/or from delivering power to the grid G of block 402, e.g. to the grid 205 through the point of injection 204. The generating unit may be a generating unit of a wind turbine 202 of the windfarm 200.

Figure 6:
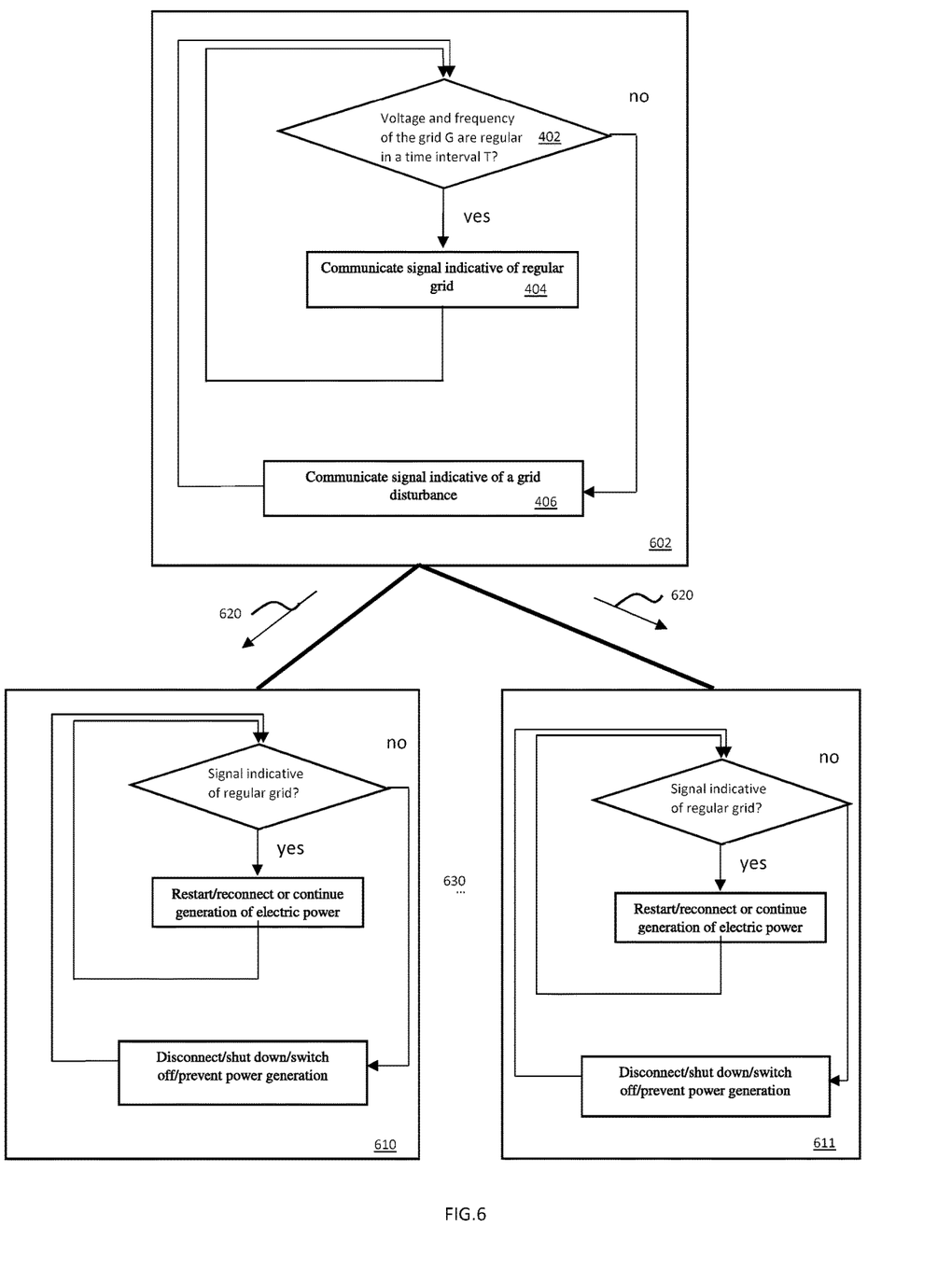
FIG. 6 illustrates a communication of a control signal to at least two generating units of a windfarm according to methods of operating a windfarm according to embodiments of the present disclosure.

FIG. 6 illustrates a communication of a control signal 620 to at least two generating units 610, 611 of a windfarm according to methods of operating a windfarm according to embodiments of the present disclosure. In FIG. 6 only two generating units 610, 611 are shown, but it is intended that more generating units may be present, as indicated by the dots 630. Each generating unit receives the control signal 620 and is operated e.g. according to the flowchart of FIG. 5 and/or according to methods of the present disclosure.

The control signal 620 may be the control signal 210 or be related to e.g. signals forming the control signal 210 when e.g. the control signal 210 includes a plurality of signals communicated to one or more wind turbines 202 of a windfarm 200. The at least two generating units 610, 611 may be generating units of wind turbines 202 of the windfarm 200.

In some embodiments, the control signal 620 may be transmitted from a windfarm controller 602 that may correspond to e.g. the windfarm controller 206 that may execute the flowchart shown in FIG. 4.

The control signal 620 may be transmitted over a transmission channel or network or through other telecommunication systems, from e.g. a windfarm controller, e.g the windfarm controller 206 of the windfarm 200 operated e.g. according to the flowchart of FIG. 4. The control signal 620 may be a signal indicative of a regular grid transmitted according to block 404 or a signal indicative of a grid disturbance transmitted according to block 406 and related to voltage and/or frequency of the grid G, e.g. the grid 205, during a time interval T, according to block 402.

For each current time instant to or time interval $T(t_0)$, the signal 620 is either a signal indicative of a regular grid according to block 404 or a signal indicative of a grid disturbance according to block 406 and it is therefore excluded that the signal 620 may be indicative of both a regular grid and a grid disturbance at a single time instant to or time interval $T(t_0)$. The signal 620 may be transmitted, but it may not be received by one or more generating units of the generating units 610, 611, e.g. due to communication problems over a communication channel that transmits the signal 620.

The signal 620 is received by the generating units 610, 611, e.g. by wind turbine generators of the windfarm. In FIG. 6, two generating units 610, 611 are indicated, but it is intended that more than two generating units may be present.

Each generating unit 610, 611 receives the signal 620 and each generating unit operates according to the flowchart of FIG. 5. In particular, each generating unit 610, 611 receives the signal 620 and checks, according to block 502, if the signal 620 is indicative of a regular grid, i.e. if the signal 620 is a signal indicative of a regular grid in accordance with the signal transmitted e.g. in block 404.

In some embodiments, each generating unit is operated according to the flowchart of FIG. 5, but the flowchart of FIG. 5 may not necessarily be executed on a local controller of the generating unit, but may e.g. be executed remotely and the generating unit is only controlled according to said flowchart, e.g. remotely over a network or other communication system.

The signal 620 may be transmitted over a network and/or as packets and/or as a broadcast signal and/or over dedicated lines for each generating unit.

Figure 7:
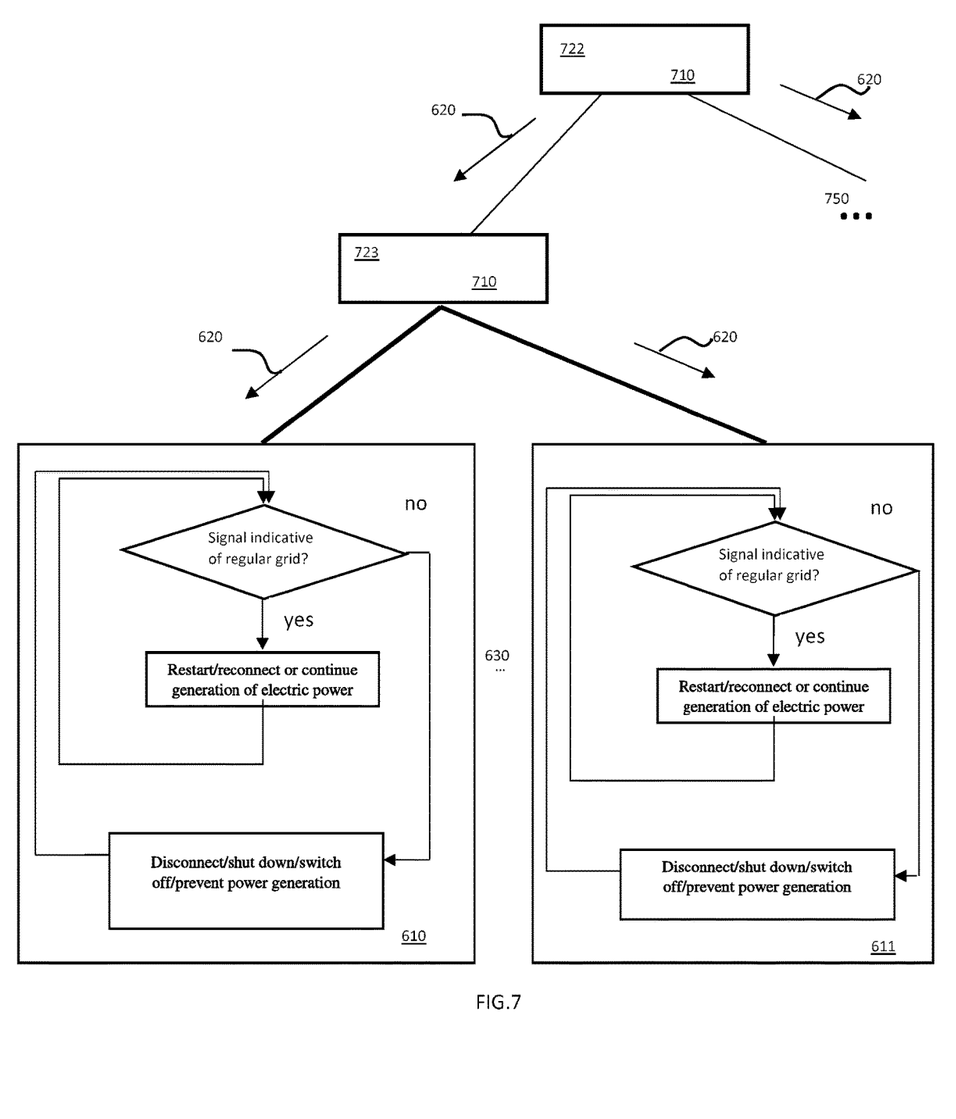
FIG. 7 illustrates a communication of a control signal to at least two generating units of a windfarm according to methods of operating a windfarm according to some embodiments of the present disclosure.

FIG. 7 illustrates a communication of a control signal 620 to at least two generating units 610, 611 of a windfarm according to methods of operating a windfarm according to some embodiments of the present disclosure. In FIG. 7, one or more controllers 710, e.g. controller 722 and 723, are configured to execute the flowchart illustrated in FIG. 4, wherein, in some embodiments, each controller 710 may be related to a different grid G and/or point of injection and/or to different locations of a single electric grid. It is intended that the time interval T is the same time interval for all controllers 710. In FIG. 7, two generating units 610, 611 are shown, but it is intended that an additional number of generating units may be present, each unit receiving the control signal 620 and operated according to e.g. the flowchart of FIG. 5 and/or according to methods of the present disclosure.

The controllers 710, and in particular controllers 722, 723 may correspond to controllers 206 related to points of injection 204 where power generated by e.g. wind turbines 202 of a windfarm 200 is transferred to an electric grid 205. It is intended that controllers 710 may at least sometimes be operated according to the flowchart of FIG. 4. For example, in some embodiments, the controller 723 may correspond to the controller 206 as shown in FIG. 2. Said controller may operate as a master controller according to the flowchart of FIG. 4 or as a slave controller. If the controller 723, corresponding in some embodiments to the windfarm controller 206, is operated e.g. as a slave controller, the controller 723 may receive a control signal from another controller 722 operating as a master controller according e.g. to the flowchart of FIG. 4. In some embodiments, the controller 723 may operate as a slave controller receiving information from a controller 722 that may be any device configured to communicate with the controller 723, e.g. through a control signal 230. In some embodiments, the controller 722 may be any device capable of monitoring an electric grid and/or a voltage and/or a frequency of the grid that may also be related to a global condition of the grid. For example, the controller 723 may be the windfarm controller 206. The controller 722 may be configured to transmit a control signal 230 to the controller 723, i.e. the windfarm controller 206 that may operate as a slave controller controlled by the controller 722 operating as a master controller. The control signal 620 transmitted from controller 722 to the controller 723 may therefore be the control signal 230. When the controller 723 operates as a slave, the control signal 620 communicated from the controller 723 to the at least two generating units 610, 611 may therefore be based at least in part on the control signal 230 and also the control signal 210 may be based at least in part on the remote control signal 230 that is passed to the generating units. Therefore, for the considered case, both the control signals 230 and 210 may correspond to the control signal 620 that may be generated by the controller 722, e.g. depending on measured voltages and/or frequencies of the electric grid. When the controller 723 operates as a slave, it only passes through the control signal 620 received from the controller 722 forming a remote device towards the generating units 610, 611, e.g. generating units of wind turbines 202 of the windfarm 200. In alternative embodiments, when the controller 723 operates as a slave, the control signal 620 transmitted from the controller 723 to the at least two generating units 610, 611 may be based in part on the control signal that controller 723 receives from the controller 722 and in part on voltages and/or frequencies monitored/measured by controller 723. Therefore, the control signal 620 may relate to one or more measurements, e.g. measurements of voltages and/or frequencies received by controller 722 and/or by controller 723.

Therefore for example, the controller 206, corresponding in some embodiments to the controller 723, may be operated as a slave controller receiving a control signal 230 from a master controller 722, that may be of different type than the controller 723. The control signal 230 may correspond to the control signal 620 that may be further passed through towards generating units 610, 611 of e.g. the wind turbines 202, through e.g. a control signal 210 also identified with the control signal 620 in said case, i.e. when the controller 206 is identified with controller 723 operated as a slave controller.

Alternatively the at least one control signal 210 may only in part be based on control signal 230 and e.g. a measurement received through the measurement input 208 is considered in combination with the control signal 230 for the generation of the at least one control signal 210 by the windfarm controller 206 corresponding for example to the controller 723. In this case the control signal 620, illustrating both control signals 210 and 230, may communicate information based on measurements received by both the controller 723, identified with the windfarm controller 206, and the controller 722. Said measurements may relate e.g. to voltages and/or frequencies of the electric grid 205 e.g. at different locations of the grid. For example the controller 722 may relate to a measurement device of a substation of the grid. Therefore, in some embodiments of the present disclosure, the controller 723 may also be operated only partially as a slave, i.e. receiving information from controller 722 but also contributing actively to the generation of the control signal 620 passed to generating units 610, 611.

In some embodiments therefore, the controller 723 operates as a slave passing through the control signal 620 received from controller 722 without actively influencing the content of the control signal 620. In some alternative embodiments the controller 723 operates partially as a slave, receiving a control signal 620 from controller 722 and passing a control signal 620 to generating units 610, 611 that is further based on voltage and/or frequencies directly measured by the controller 723. In some alternative embodiments the controller 723 operates as a master controller and the control signal 620 passed to generating units 610, 611 is only based on measurements received by the controller 723. It is intended that when the controller 723 operates partially as a slave, the controller executes the flowchart of FIG. 4 and the measured voltages and/or frequencies considered in block 402 are voltages and/or frequencies in accordance with block 302 related e.g. to multiple locations of the electric grid, for example to locations monitored by controller 722 and controller 723.

Although controller 722 and 723 are represented by different blocks, they may form a single device, e.g. a single controller 710 and/or may be implemented by any alternative device capable of generating a control signal 620 communicated to generating units 610, 611 according to the present disclosure, e.g. a control signal 210.

In yet other embodiments, a plurality of controllers 710 may be present and each controller 710 may be configured to receive a control signal 620 from another controller 710 and to pass said signal to other controllers 710 and/or to generating units in a hierarchical way. In FIG. 7, two controllers 710 are depicted, indicated by 722 and 723 respectively. Controller 722 may operate as a master controller and controller 723 may operate as a slave controller When controller 722 operates as a master controller, a signal 620 is communicated from controller 722 to e.g. controller 723 that forms e.g. a slave controller. Controller 723 may finally transmit the signal 620 to at least two generating units respectively, e.g. 610, 611. It is intended that the controller 722, when operated as a master controller, forms a topmost controller in a hierarchy of controllers, whereas slave controllers, e.g. controller 723 operated as a slave controller, are lower in said hierarchy. The hierarchy may include one, two or more levels. Slave controllers may only pass through a control signal 620 towards generating units and/or other controllers or the slave controllers may further adjust the control signal 620 based on further measurements of voltages and/or frequencies received by the slave controllers, said signal 620 originating from the master controller, i.e. the topmost controller in the hierarchy. Therefore a slave controller, when executing block 402, may consider measurements received directly and/or information received from other controller through the control signal 620. When for example another controller or substation communicates an irregular grid condition to the slave controller, the slave controller may directly execute block 406. When another controller communicates a regular grid condition, the slave controller may evaluate the condition of block 402 based on further measurements directly received by the slave controller or, alternatively, may simply pass through the received signal.

Each controller may be related to an electrical grid and a point of injection and/or only to an electrical grid where voltages and/or frequencies are measured for example at different locations. Different controllers may be related to the same grid and e.g. measure voltages and/or frequencies of the same grid e.g. at different locations. Different controllers may be implemented on a single device, e.g. on a single computing unit.

Alternatively or additionally, a controller, e.g. the controller 722, may be implemented by any system capable of measuring voltages and/or frequencies of an electric grid and/or to receive measured data related to voltages and/or frequencies of the grid and to transmit a signal, e.g. the control signal 620 and/or 230 towards a windfarm controller that may be operated as a slave, e.g. the controller 723 that may correspond to the controller 206. In some embodiments, the controller 722 may be operated by a grid utility operator and the signal 620 transmitted to the controller 723, for example the signal 230 transmitted to the windfarm controller 206, may be based at least in part on a decision of the grid utility operator e.g. in function of measured voltages and/or frequencies and/or in function of any information e.g. related to the electric grid.

In some embodiments, where multiple electric grids may be considered, the electric grid G related to the master controller and the corresponding point of injection related to the master controller and/or monitored by the master controller determines the signal 620 that may correspond therefore to the signal communicated in blocks 404 or 406.

In some embodiments, a hierarchy of controllers may be represented with a tree, having controllers and/or generating units as nodes and wherein an edge between controllers and/or between generating units and controllers is present if and only if a control signal 620 is transmitted, e.g. transmitted from a master controller to a slave controller or from a slave controller to a generating unit or e.g. from a slave controller to another slave controller e.g. lower in the hierarchy. It is intended that the signal 620 is passed to all nodes lower in the hierarchy and that a transmission path of the signal 620, i.e. a path between nodes in the tree, does not form a loop or a cycle. Therefore, a hierarchy of controllers is formed, wherein controllers higher in the hierarchy pass through signals 620 to controllers lower in the hierarchy that may or may not further affect the content of the control signal 620. The control signal 620 is finally communicated to the generating units 610, 611. The tree may be configured dynamically by e.g. a grid utility operator.

The topmost controller in the hierarchy, i.e. the master controller, i.e. the root of the tree, e.g. the topmost controller 722 in FIG. 7, may be operated according to the flowchart of FIG. 4 and it is intended that the topmost controller 722 in the hierarchy relates to a given electric grid G associated with the controller 722, i.e. $G=G_{722}$, and a given point of injection for injecting power to said electric grid $G_{722}$, according to FIG. 4. It is intended that when the topmost controller 722 controls generating units according to the hierarchy of FIG. 7, under nominal conditions, i.e. assuming absence of disturbances and imbalances, all the generated electric power flows to said grid $G=G_{722}$, through said point of injection.

In some embodiments the slave controllers further affect the signal 620. For example when the controller 723 operates as a slave controller, controller 723 may execute the flowchart of FIG. 4 taking into account the control signal 620 received from controller 722 and/or measurements received directly. For example, when the controller 723 operating as a slave controller executes block 402, the condition of block 402 evaluates to true if and only if controller 722 communicates a signal indicative of a regular grid and the voltages and/or frequencies directly monitored/measured by controller 723 are regular, i.e. within the predetermined bounds.

The hierarchical configuration may be changed, i.e. the master controller may be configured and/or reconfigured. For example, in FIG. 7 the controller 723 may be configured to become the topmost controller in the hierarchy, i.e. the master controller, instead of controller 722. Then a signal 620 between controller 722 and controller 723 would not be received/communicated anymore and controller 723 would communicate a signal 620 to slave controllers that are lower in the hierarchy and/or to generating units, e.g. to generating units 610, 611.

When controller 723 becomes the master controller, i.e. the topmost controller in the hierarchy, it is intended that controller 723 operates according to the flowchart of FIG. 4. For example, the controller 723 operated as a master controller may be the controller 206, and the grid G may be the grid 205 and the related point of injection may be the point of injection 204, and e.g. the control signal 620 may be the control signal 210 based on e.g. a measured voltage and/or frequency of the electric grid 205 at the point of injection 204, according to the measurement input 208 to the controller 206. When e.g. the controller 206 operates a master controller, in some embodiments the operation may be independent of control signals 230 received from other controllers, e.g. from controller 722.

In some alternative embodiments, the controller 722 may only measure voltages and/or frequency of a grid or receive measured voltages and/or frequencies of a grid, that may also be the same grid $G_{723}$ related to controller 723, e.g. the controller 722 may measure voltages and/or frequencies at a specific location of the grid $G_{723}$, for example a remote location. Therefore the controller 722 may transmit to the controller 723 a control signal 620 based on the measured voltages and/or frequencies.

FIG. 7 only schematically and exemplarily shows that master and slave controllers 710, that may correspond to e.g. controllers 206, may form a tree structure, with the master controller forming a root of said tree structure. It is intended that the tree may be configured or reconfigured, e.g. by a grid utility operator. Edges in the tree relate to ordered pairs of controllers, wherein the first controller in the pair sends a control signal 620 to the second controller in the pair, e.g. a control signal 230, or to ordered pairs of controllers and generating units, wherein the controller in the pair communicates a control signal 620 to the generating unit in the pair, e.g. the control signal 210.

The root may be reconfigured, e.g. a root of a subtree may become the new master controller and a signal 620 from the previous root is not passed through towards the leaves anymore.

Control signals 620 communicated by a controller, e.g. the controller 722, may be communicated to a plurality of controllers and/or generating units in the tree structure. For example controller 722 may communicate a control signal 620 to the controller 723 and to one or more additional controllers or generating units represented by the dots 750.

One or more controllers may be implemented on a same device, e.g. on the same computing unit by any implementation capable of delivering a control signal 620 to the generating units according to embodiments of the present disclosure.

More generally, embodiments of the present disclosure relate to a method of operating a windfarm 200 connected to an electric grid 205 via a point of injection 204 for injecting power from the windfarm to the electric grid, the windfarm including at least two generating units 610, 611, e.g. generating units of wind turbines 202 and a windfarm controller 206, the method including: measuring voltage and/or frequency characteristics of an electrical signal of the electric grid 205 at the point of injection 204, communicating to at least two generating units of the at least two generating units of the windfarm at least one control signal 620, e.g. a control signal 210, based at least in part on the measured voltage and/or frequency characteristics of the electrical signal of the electric grid 205 at the point of injection 204, the at least one control signal being indicative of a grid situation at the point of injection, and controlling the at least two generating units of the at least two generating units of the windfarm at least in part based on the communicated at least one control signal 620, e.g. the control signal 210.

In some embodiments, at least one control signal 620 is configured to communicate a grid condition of the grid G, wherein the grid condition is either a regular grid condition, according to block 404, or a disturbance condition of the grid, according to block 406, and wherein the at least two generating units 610, 611 are configured to be operated according to the at least one control signal 620, and wherein when the at least one control signal is not communicating a regular grid condition, the at least two generating units are disconnected and/or in a shutdown state and/or switched off state, according to block 506.

In some embodiments, the at least one control signal 620 indicates a grid disturbance when a voltage of the electrical signal of the electric grid G at the point of injection is outside a predetermined voltage interval, and/or when a frequency of the electrical signal of the electric grid at the point of injection is outside a predetermined frequency interval.

For example, for each phase or combination of phases, the predetermined voltage interval may be [0.95 $U_{nominal}$, 1.05 $U_{nominal}$] wherein $U_{nominal}$ is a nominal voltage of the grid, for example a RMS voltage difference between different phases or a RMS voltage difference between a phase and neutral. For example, the predetermined voltage interval may be characterized by a voltage U satisfying the condition 95% $U_{nominal} \leq U \leq 105\%$ $U_{nominal}$. For example, the predetermined frequency interval may be [49.9 Hz, 50.1 Hz], i.e. the predetermined frequency interval may be characterized by a frequency f satisfying the condition 49.9 Hz$\leq$f$\leq$50.1 Hz. In some embodiments, the predetermined voltage interval and/or the predetermined frequency interval may be grid code dependent. In some embodiments, a reconnection/restart is allowed e.g. when the voltage U satisfies U>0.95 $U_{nominal}$ with $U_{nominal}$ a nominal voltage of the grid.

In some embodiments, a reconnection/restart of generating units of the windfarm is not allowed when a voltage U of the grid, for example a voltage difference U between two phases, is outside an interval [0.95 $U_{nominal}$, 1.05 $U_{nominal}$] wherein $U_{nominal}$ is a nominal voltage of the grid, for example a nominal RMS voltage of a voltage difference between different phases; i.e. if U>105% $U_{nominal}$ or U<95% $U_{nominal}$, a reconnection/restart of generating unit is not allowed and/or generating units are disconnected/shut down. In some embodiments, a reconnection/restart of generating units of the windfarm is not allowed when a frequency f of the grid, for example a frequency of a phase, is outside the interval [49.9 Hz, 50.1 Hz]; i.e. if f>50.1 Hz or f<49.9 Hz, then a reconnection/restart of generating units of the windfarm is not allowed and/or generating units are disconnected/shut down.

In some embodiments, the voltage and/or the frequency intervals may be grid code dependent. The intervals may be independent on the characteristics of the wind turbines. For example, the intervals may not depend on a nominal power of wind turbine generators.

In some embodiments, when the at least one control signal 620 indicates a grid disturbance, according to block 406, the generating units, e.g. 610, 611, are disconnected and/or stopped and/or restrained from restarting, in order to prevent a power transfer between the generating units and the grid.

In some embodiments, when the at least one control signal 620 does not indicate a grid disturbance, the generating units 610, 611 of the windfarm are operated in order to transfer power to the electric grid G, for example the electric grid 205.

In some embodiments, the at least one control signal is further configured to allow a detection of a lost or invalid communication such that the generating units, e.g. 610, 611, are capable of detecting whether the at least one control signal 620 is lost or invalid.

In particular, the control signal 620 may therefore communicate the presence of a grid disturbance according to block 406 or the control signal 620 may communicate a regular grid according to block 404 or, in some embodiments, if the control signal 620 is lost or invalid, the check performed in block 502 may be followed by the execution of block 506, i.e. a lost or invalid communication of the control signal 620 is considered to be equivalent to the presence of a grid disturbance and/or to the absence of a regular grid condition at the grid G at the point of injection.

In some embodiments, the generating units are disconnected and/or stopped and/or prevented from restarting whenever a lost or invalid at least one control signal is detected.

In some embodiments, the point of injection can be selected from a set of points of injection.

In some embodiments, the electric grid G at the point of injection is monitored by a controller, and the communication of the at least one control signal is carried out with the use of said controller, for example the controller 723 or the windfarm controller 602.

The controller executes the flowchart illustrated in FIG. 4. Therefore the controller is in particular configured to receive and to process data relative to voltage and frequency of the grid G at the point of injection during the interval T. It is intended that when the controller monitors the electric grid G, the monitoring corresponds to the execution of block 402 with respect to voltage and frequency of the grid G at the point of injection during the interval T.

In some embodiments, voltages and/or frequencies of the electric grid G may be measured anywhere in the grid G and/or depend on a global condition of the grid G and therefore the measurement can be carried out at a physical distance from the point of injection.

In some embodiments, the controller is a windfarm controller of the windfarm, the controller monitoring an electric grid at a point of injection.

In some embodiments, the controller is a master controller monitoring the electric grid at a point of injection and the at least one control signal is communicated by the master controller to the at least two generating units through at least one slave controller that passes at least one control signal to the at least two generating units.

For example, a master controller 722 monitoring an electric grid at a point of injection may communicate a control signal 620 to generating units 610, 611 through e.g. a slave controller 723. In some embodiments the slave controller may further process the control signal 620 based on e.g. a monitoring of voltages and/or frequencies carried out by the slave controller.

In alternative embodiments, the master controller may be any device capable of transmitting a control signal 620 to a slave controller 723, e.g. the windfarm controller 206 operated as a slave. The control signal may be based on measured voltages and/or frequencies of an electric grid and/or on information or decisions received by an operator that are processed either manually or automatically.

In some embodiments, each controller in a set of controllers is configured to monitor an electric grid, and the master controller and the at least one slave controller are chosen from the set of controllers.

Different electric grids and/or the same electric grid may be monitored by the controllers in the set of controllers. A controller in the set may be any device capable of transmitting a control signal 620 and/or a control signal 230 or 210 to other controllers operated as slaves and/or to generating units. Said control signal may be in particular based on voltages and/or frequencies of the grid and/or on information about the grid condition and/or on a decision of an operator that may be obtained automatically and/or manually.

For example, given the set of controllers {722, 723}, each controller may be configured to monitor an electric grid, e.g. the controller 722 may monitor a grid $G_{722}$ and the controller 723 may monitor a grid $G_{723}$. The grids may be different grids or the same grid, i.e. it may be $G_{722}=G_{723}$. Either 722 or 723 can be configured as a master controller. When e.g. the controller 722 is chosen as master controller, then the controller 722 transmits a signal 620 to generating units 610, 611 through e.g. the slave controller 723. When e.g. the controller 723 is chosen as master controller, then the controller 723 transmits a signal 620 to e.g. generating units 610, 611 without receiving a signal from the controller 722.

Some embodiments of the present disclosure relate to a windfarm including at least two generating units, a windfarm controller and at least one point of injection, the wind farm being connected to an electric grid via the at least one point of injection for injecting power from the windfarm to the electric grid, wherein the at least two generating units are capable of being controlled through a control signal by the windfarm controller, the windfarm controller being configured for being operated according to methods of the present disclosure.

In some embodiments, the windfarm further includes at least one measurement instrument for measuring voltage and/or frequency of an electric signal of the electric grid at the point of injection.

In some embodiments, the windfarm further includes one or more transformers, one or more converters and/or one or more inverters.

Methods and windfarms of the present disclosure are beneficial in order to reduce or avoid an instability of an electric grid receiving power from generating units of one or more windfarms during or after a disturbance affecting the grid.

Methods and windfarms related to the present disclosure are beneficial for an ordered restart and/or reconnection of generating units to an electric grid in particular after the occurrence of a disturbance. If individual generating units are prevented from restarting and reconnecting individually, and are instead collectively coordinated in an ordered way with the use of methods described in the present disclosure, the possibility of an instable dynamics during restart or reconnection, e.g. due to feedbacks or transients, is avoided, reduced or minimized.

The invention claimed is:

1. A method of operating a wind farm connected to an electric grid via a point of injection for injecting power from the wind farm to the electric grid, the wind farm including a plurality of generating units having a turbine-level controller, a farm-level controller, and an external master control device, the method comprising:

measuring voltage and frequency characteristics of an electrical signal of the electric grid at the point of injection;

communicating to at least two generating units of the plurality of generating units of the wind farm at least one control signal based, at least in part, on the voltage and the frequency characteristics of the electrical signal of the electric grid at the point of injection; and, controlling the at least two generating units based on the at least one control signal;

wherein the electric grid at the point of injection is monitored by at least one of the farm-level controller or the external master control device, and the communication of the at least one control signal is carried out with the use of at least one of the farm-level controller or the external master control device;

wherein the at least one control signal communicates a grid condition that is either a regular grid condition or a disturbance condition of the grid;

wherein, when the voltage and frequency characteristics are within a predefined range, the grid condition corresponds to the regular grid condition and the at least two generating units are operated in order to transfer power to the electric grid;

wherein, when the voltage and frequency characteristics are outside of the predefined range, the grid condition corresponds to the disturbance condition and the at least two generating units are prevented from restarting or reconnecting to the electrical grid in order to prevent a power transfer between the at least two generating units and the electric grid for as long as the voltage and frequency characteristics are outside of the predefined range;

wherein, when the voltage and frequency characteristics are within a predefined range and the at least two generating units are operated in order to transfer power to the electric grid, the farm-level controller is configured to monitor the voltage and frequency characteristics of the electrical signal of the electric grid directly at the point of injection and carry out the communication of the regular grid condition to the at least two generating units;

wherein, when the voltage and frequency characteristics are outside of the predefined range, the farm-level controller operates as a slave controller disabled from monitoring the electric grid directly at the point of injection, and wherein the master controller is configured to take over monitoring of the electric grid and communicate the at least one control signal to at the least two generating units through the slave controller;

wherein the at least one control signal is further configured to allow a detection of a lost or invalid communication such that the at least two generating units are capable of detecting whether the at least one control signal is lost or invalid; and wherein the at least two generating units are disconnected, stopped, or prevented from restarting whenever a lost or invalid at least one control signal is detected.

2. The method of claim 1, wherein the point of injection is selected from a set of points of injection.

3. A wind farm operated according to the method of claim 1.

4. The wind farm of claim 3, further comprising at least one measurement instrument for measuring the voltage and the frequency characteristics of the electrical signal of the electric grid at the point of injection.

5. The wind farm of claim 3, further comprising one or more transformers, one or more converters, and/or one or more inverters.

* * * * *